Nov. 28, 1933.  J. R. GREEN  1,937,017
METHOD OF AND APPARATUS FOR CONTROLLING REGENERATIVE FURNACES
Filed March 28, 1930   3 Sheets-Sheet 1

INVENTOR.
JOHN R. GREEN
BY John E. Hubbell
ATTORNEY

Nov. 28, 1933.   J. R. GREEN   1,937,017
METHOD OF AND APPARATUS FOR CONTROLLING REGENERATIVE FURNACES
Filed March 28, 1930   3 Sheets-Sheet 2

INVENTOR.
JOHN R. GREEN
BY John E. Hubbell
ATTORNEY

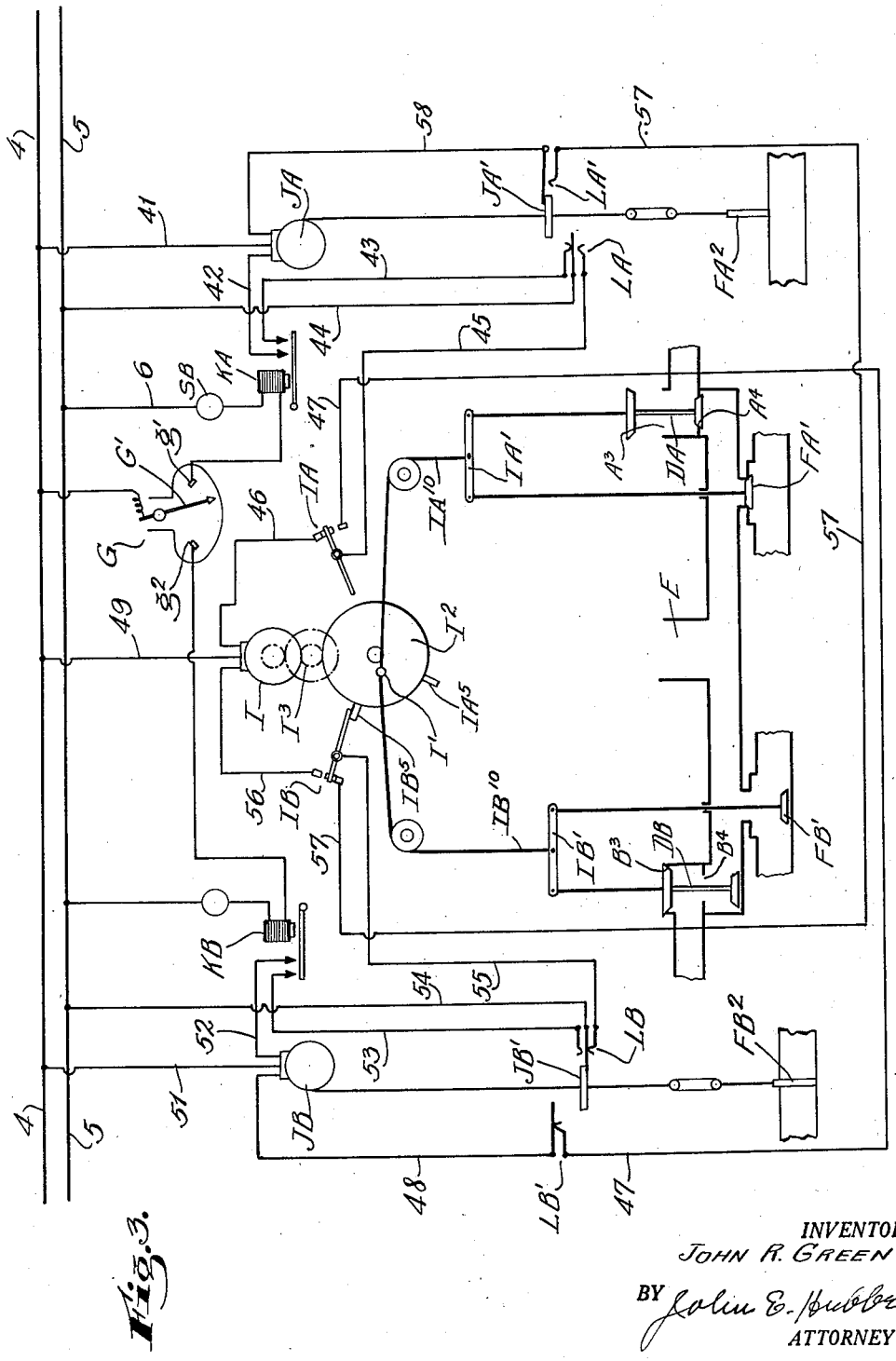

Patented Nov. 28, 1933

1,937,017

UNITED STATES PATENT OFFICE 1,937,017

METHOD OF AND APPARATUS FOR CONTROLLING REGENERATIVE FURNACES

John R. Green, Cincinnati, Ohio, assignor to The Brown Instrument Company, Philadelphia, Pa., a corporation of Pennsylvania Application March 28, 1930. Serial No. 439,611

5 Claims. (Cl. 236—15)

The general object of the present invention is to provide a simple and effective method of and apparatus for controlling the reversal of regenerative furnaces in response to the temperature conditions in the regenerators and in such manner as to provide for a reversal of flow through the regenerators at reversal periods better adapted for desirable and efficient operation of the furnace than when the periods of reversal have been determined in accordance with previous practice.

Heretofore it has been the regular practice in the operation of regenerative furnaces to reverse the flow through the regenerators at regular timed intervals whether the reversal is effected by automatic clock control mechanism or is effected manually in response to the indications of a clock. In accordance with the present invention the reversal periods are determined automatically by thermostatic mechanism responsive to the difference between the temperatures in the on and off regenerators. By making the times of reversal dependent upon the differential of the temperatures in the on and off regenerators in accordance with the present invention it becomes practically possible and readily feasible to make a more effective utilization of the two regenerators than has heretofore been possible when, as is not infrequently the case, one regenerator is in more efficient condition than the other. In such case the more efficient regenerator may advantageously be operated through a different range of temperature variations than the other.

In accordance with the present invention the thermostatic mechanism measuring the temperature differential between the on and off regenerators may be employed to actuate indicating devices guiding an operator in effecting manual adjustment of the reversing valves or manual control of the reversing mechanism, or for the automatic control of motors for adjusting the reversing valves or for actuating automatic mechanism and simultaneously indicating the necessity for such actuation so that any failure of the automatic mechanism may be brought to the attention of the operators.

Those skilled in the art will understand of course that the invention is applicable alike to furnaces comprising but two regenerator chambers, one of which at any one period is the "on" regenerator, and the other the "off" regenerator, and to furnaces in which each "on" regenerator and each "off" regenerator comprises a plurality of regenerator chambers and that in the latter case the regenerators may be used in preheating both gaseous fuel and air for combustion.

A desirable characteristic of the invention is that it permits of the ready use, with little or no change, of existing commercial forms of regulating and control devices. In particular, the regulating instrument proper may well be an indicating or recording meter with control or signal contacts of any of various types now in commercial use for other purposes.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described preferred embodiments of the invention.

Of the drawings:—

Fig. 3 is a diagrammatic representation of one form of automatic control mechanism devised for use for the furnace shown in Fig. 2.

Figure 1:
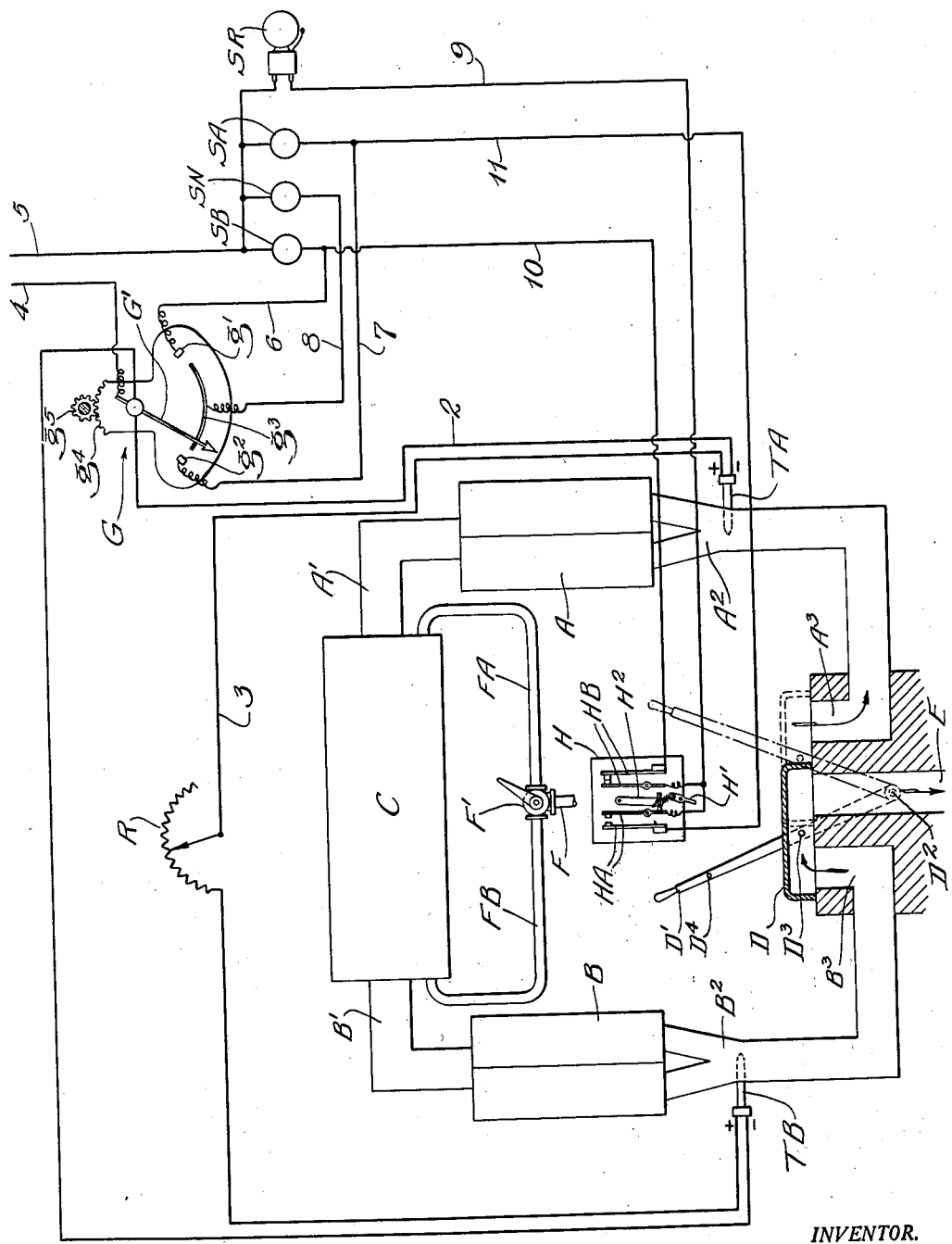
Fig. 1 is a diagrammatic representation of a regenerative furnace equipped with one form of the present invention.

In Fig. 1 of the drawings I have illustrated the use of the present invention in connection with an open hearth regenerative furnace C provided with a manually controlled regenerator reversing mechanism. The furnace C as diagrammatically shown in Fig. 1 receives preheated air for supporting combustion from one, and discharges products of combustion into the other of two cooperating regenerator chambers A and B through the corresponding regenerator connections A' and B'. The regenerator chambers A and B alternately receive air to be preheated and discharge products of combustion through conduits $A^2$ and $B^2$, respectively.

As shown in Fig. 1 the direction of flow through the regenerator chambers and furnace is dependent on the position of a manually adjusted reversing valve D, of the so-called turtle back valve type. In the position of the valve D shown in full lines in Fig. 1, the conduit $A^2$ is connected through port $A^3$ to the atmosphere, and the conduit $B^2$ is open through its port $B^3$ to a conduit E running to the stack. In this condition of the reversing valve atmospheric air entering the channel $A^2$ through the port $A^3$ passes into the regenerator chamber A wherein it is preheated by contact with the checker brick and walls thereof. From the regenerator A, preheated air passes through the conduit A' to the furnace C. Products of combustion leaving the furnace C through the passage B' pass through the regenerator chamber B and give up heat to the checker work and walls thereof. From the regenerator chamber B, partially cooled gases pass through the connection $B^2$, port $B^3$ and chambered valve D to the stack connection E. The described flow of air and products of combustion is effected by the stack suction impressed on the stack connection E. When the valve D is adjusted into its dotted line position as shown in Fig. 1 the port $B^3$ is open to the atmosphere, and the port $A^3$ is connected to the stack connection E. The flow of air and products of combustion through the regenerators and furnace are then in the opposite direction to that previously described. As shown, the valve D is shifted between its two operative positions by means of a manually adjustable lever D' fulcrumed at $D^2$ and pivotally connected to the valve D at $D^3$.

The furnace shown in Fig. 1 is intended for use of oil, natural gas or other fluid fuel which is not regeneratively preheated before its introduction into the furnace. F represents the oil fuel supply line with branches FA and FB running to the opposite ends of the furnace A. A fuel reversing valve F' is adjustable from one position in which fuel is supplied to the furnace through the branch FA into another position in which it is supplied through the branch FB. Advantageously, and in accordance with the usual practice, the valve F' is movable between its extreme positions through an intermediate position in which the supply of fuel to both branches FA and FB is cut off. The normal reversal sequence involves the adjustment of the valve F to cut off the fuel supply to the end of the furnace previously receiving it, the adjustment of the valve D from one of its positions to the other, and then the further adjustment of the valve F' to supply fuel to the end of the furnace A then receiving preheated air.

In accordance with the present invention, thermostatic devices TA and TB advantageously, and as shown in the form of thermo-couples, are employed to create a regulating force which is a measure of the differential between the regenerator temperatures. The thermo-couples TA and TB may be located in the regenerators A and B, respectively, adjacent their connections to the conduits $A^2$ and $B^2$, but preferably are located, as shown, in those connections at points close to the corresponding regenerators. As shown, the negative terminal of the thermocouple TA is connected by a conductor 2 to the other terminal of the winding of a galvanometer G. The positive terminal of the thermo-couples TA and TB are connected by a conductor 3. The galvanometer is arranged so that its pointer G' deflects in the counter-clockwise direction as the temperature and thereby the voltage of the thermo-couple TB exceeds those of the thermo-couple TA. A rheostat R, shown as included in the conductor 3, forms a means for varying the magnitude of the voltage actually impressed on the windings of the galvanometer B by any given difference between the opposing voltages of the thermo-couples TA and TB.

When the temperature of products of combustion flowing to the stack over the thermo-couple TB, exceeds the temperature of the air entering the regenerator A by a predetermined amount, the corresponding excess of the voltage of the thermo-couple TB over that of the thermo-couple TA, deflects the galvanometer pointer G' into engagement with an instrument contact $g'$. Conversely, when the temperature of the gases passing away from the regenerator A past the thermo-couple exceeds the temperature of the air entering the regenerator B by a predetermined amount, the galvanometer pointer G' is brought into position for engagement with the contact $g^2$. In intermediate positions of the galvanometer pointer G', the latter is in engagement with an elongated contact $g^3$. Provisions are made for angularly adjusting the contacts $g'$, $g^2$ and $g^3$ relative to the path of movement of the galvanometer pointer G'. To this end in the arrangement shown in Fig. 1, the contacts $g'$, $g^2$ and $g^3$ are mounted on a table or support $g^4$ which by means of a manually rotatable adjusting gear $g^5$, may be angularly adjusted about the axis of deflection of the pointer G'.

The engagement of the galvanometer pointer G' with one or another of the contacts $g'$, $g^2$ and $g^3$ may be employed to actuate indicating or control, or both indicating and control devices of various types. In the arrangement shown in Fig. 1, the engagement of the pointer G' with one of the contacts $g'$, $g^2$ and $g^3$ energizes a corresponding signal lamp SB, SA and SN, respectively. In addition, the engagement of the galvanometer pointer G with either of the contacts $g'$ or $g^2$ energizes a bell or analogous alarm device SR.

The circuit arrangements through which the signal lamps and alarm device are controlled by the position of the galvanometer pointer G', comprises supply conductors 4 and 5, the supply conductor 4 being connected, as shown, to the galvanometer pointer G', and the supply conductor 5 being connected to one terminal of each of signal lamps SB, SN and SA, and to one terminal of the alarm device SR. The second terminal of the lamp SB is connected by a conductor 6 to the control instrument contact $g'$. The second terminal of the signal lamp SA is connected by conductor 7 to the control instrument contact $g^2$. The second terminal of the signal lamp SR is connected by conductor 8 to the contact $g^3$. The second terminal of the alarm device SN is connected through a conductor 9 and other connections to the galvanometer G' and thereby to supply conductor 4, whenever the galvanometer engages one or the other of the contacts $g'$ and $g^2$. As shown, said other connections include a toggle switch mechanism H having switch contacts HB, through which, when closed, the conductor 9 is connected to a conductor 10, and thence to the conductor 6 and contact $g'$. The switch mechanism also comprises switch contacts HA which when closed connect the conductor 9 to a conductor 11 and thereby to the conductor 7 and contact $g^2$.

As the contacts HA and HB tend to close but one or the other of these sets of contacts which are normally held open, whichever of the contacts HA and HB are closed at any particular time, depends upon the position of the reversing valve D. With the latter in the position shown in full lines in Fig. 1, a primary actuating member H' of the switch mechanism H holds a second actuating member $H^2$, and the contacts HB are permitted to close. When the reversing lever D' is swung into its dotted line position, a pin $D^4$ carried by the lever engages the switch actuating member H' and oscillates the latter, and thereby adjusts the position of the member $H^2$, so that the latter then permits the contacts HA to close but holds the contacts HB apart. When the lever D' is shifted from the dotted line position, back into the full line position of Fig. 1, the switch parts H' and H² are shifted to again open the contacts HA and permit the contacts HB to close. With the described arrangement, the alarm SR is energized whenever the galvanometer pointer G' engages either contact $g'$ or $g^2$, and the energization of the alarm is then maintained until the lever D' is operated to shift the reversing valve from its full line position into its dotted line position.

The method of regulating the reversal times in response to the difference between the exit temperatures of the two regulators in the general manner illustrated and described in, and in connection with Fig. 1, is characterized by its simplicity and effectiveness, and in particular by the flexibility of the regulation and the ease with which the intervals between successive reversals may be modified as required to accommodate different conditions of operation. The average frequency of reversal may be varied as desired by the adjustment of the rheostat R. This permits of the particular compromise considered desirable under any given set of operating conditions between the increased disturbance in furnace operation due to increased frequency of reversal on the one hand, and the undesirable increase in the difference between the temperature of preheated air passing from the regenerative chamber to the furnace C, and the temperature of the partially cooled products of combustion from that furnace, which results from a decrease in the frequency of reversals.

If in operation it is found that the average temperature at which air passes from one regenerator to the furnace C is higher than the average temperature at which air is passing from the other regenerator to the furnace, those average temperatures may be easily equalized by the manipulation of the gear $g^5$ to bodily adjust the contacts $g'$, $g^2$ and $g^3$ angularly about the axis of deflection of the galvanometer needle G'. The occasion for the adjustment last referred to may be determined from the general operation of the furnace or from measurements of the temperatures in the conduits A' and B'. The occasion for such adjustment is also indicated by more or less regular inequalities in the time intervals between successive reversals. Such inequalities ordinarily indicate inequalities in regenerator efficiency or other conditions of operation which may be compensated for advantageously by adjustment of the table $g^4$ to vary the relative magnitudes of the temperature differentials effecting successive reversals.

The use of the invention does not interfere with the control of the fuel supply by the operator as required to regulate temperature drift in the regenerators and to insure the highest maximum regenerator temperature consistent with safe operation. Moreover, such adjustments of the fuel supply do not necessarily require resetting of the control instrument.

The regulation of the reversal times in the manner described is especially advantageous during periods of starting up a cold furnace when all regenerator temperatures are below normal, or in restarting a hot furnace which has been shut off for a short time and in which the regenerator exit temperatures are above normal, so that it is not then possible to approximate satisfactory operating conditions by making the reversal periods dependent upon the maximum exit temperature of either regenerator unless account is also taken of the corresponding exit temperature of the other regenerator.

Figure 2:
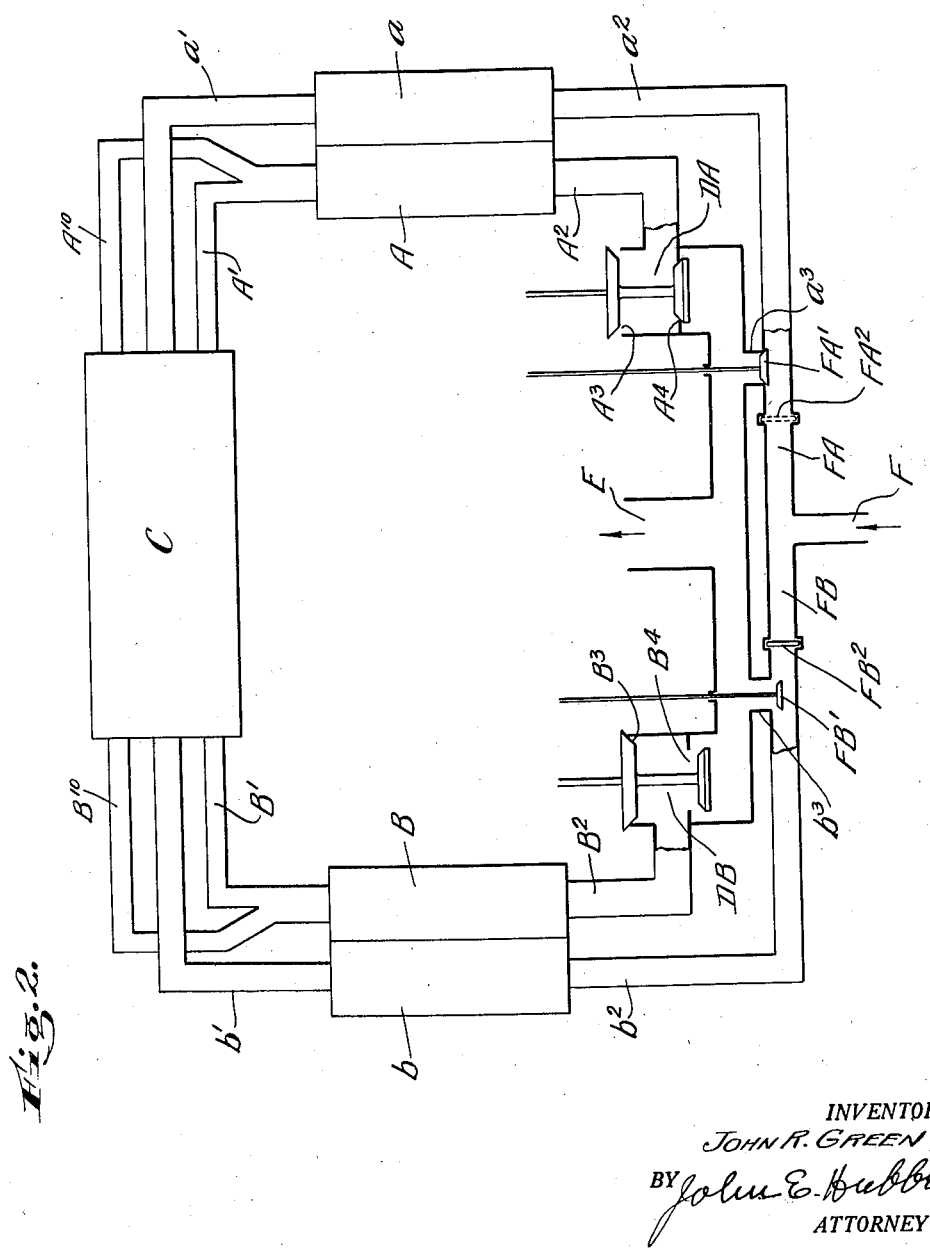
Fig. 2 is a diagrammatic representation of a different form of regenerative furnace to which my invention is applied.

As previously stated, my invention is applicable to a furnace in which both air and fuel gas are preheated in regenerator chambers as is the case with the arrangement illustrated by way of example in Fig. 2. Air regenerators A and B are employed in Fig. 2 as in Fig. 1, though as shown in Fig. 2 the air regenerator chambers A and B are advantageously connected to the furnace C by conduits A' and A¹⁰, and B' and B¹⁰, respectively. Alongside the regenerator chamber A is a fuel gas regenerator chamber $a$ connected to the furnace C by a conduit $a'$. Similarly, a fuel gas regenerator chamber $b$ is arranged alongside the regenerator chamber B and is connected to the furnace C by a conduit $b'$.

As shown in Fig. 2, a double mushroom valve DA is employed to alternately connect the regenerator conduit A² to the atmosphere through a port A³, or to the stack connection E through a port A⁴. The conduit $a^2$ is connected to the stack connection E through a port $a^3$ when a valve FA' is open, and to the branch FA of the fuel gas supply line F when a valve FA² is open. Associated with the regenerator chambers B and $b$ of Fig. 2 are valves, ports and conduits B², B³, B⁴, DB, $b^2$, $b^3$, FB' and FB², corresponding to the parts A², A³, A⁴, DA, $a^2$, $a^3$, FA' and FA², respectively.

In the intended use in accordance with the present invention, of the apparatus shown in Fig. 2, the flow through the regenerator chambers A and $a$ and B and $b$, is reversed, in response to the same changes in regenerator temperature conditions described above as determining the reversal of flow through the regenerator chambers A and B of Fig. 1. In Fig. 2 the parts are shown in the position in which air and fuel gas are being preheated in the regenerator chambers A and $a$, respectively. In reversing the flow through the regenerative chambers, the valve FA² is first closed to shut off the supply of fuel gas to the regenerator chamber $a$. Thereafter the valves DA and DB are next adjusted to connect the regenerator chamber A to the stack through port A⁴, and to connect the regenerator chamber B to the atmosphere through a port B³, and the valves FA' and FB' are simultaneously adjusted to connect the regenerator chamber $a$ to, and to disconnect the regenerator chamber $b$ from the stack connection E. The reversal operation is then completed by opening the valve FB² and thereby connecting the fuel gas supply conduit to the regenerator chamber $b$. The reversal operation restoring the conditions shown in Fig. 2 involves first the closure of the valve FB², then the shifting of the valves DA, DB, FA' and FB', and finally the opening of the valve FA², thus restoring the apparatus to the conditions shown in Fig. 2.

The operation of the various valves adjusted in reversing the flow through the regenerators and furnace of Fig. 2, may be manually effected or manually controlled in response to the indications of thermostatically controlled signalling mechanism of the exact character shown in Fig. 1. As previously explained, however, the thermostatically controlled mechanism shown in Fig. 1 may also be employed to automatically control the reversing mechanism, and in Fig. 3 I have illustrated additions to the mechanism shown alike in Figs. 1 and 2, which may be employed in automatically controlling the various reversing valves shown in Fig. 2. As shown in Fig. 3, the valves DA and FA' are connected by an equalizing bar IA' and cable IA¹⁰ to a crank pin I' carried by a crank disc I² which is oscillated by a reversing motor I. The valves DB and FB' are similarly connected to the crank pin I' by an equalizing bar IB' and cable IB¹⁰. As shown, the crank disc I² oscillates through an angle of about 150° to effect its flow reversing operations. In practice the motor I ordinarily operates the crank disc I² through suitable speed reducing gearing I³ of any well known or suitable type. The valve FA² is opened and closed by a reversible motor winch JA. The fuel valve FB² is operated by a similar reversible motor winch JB.

As diagrammatically shown in Fig. 3, the energization of the motor winch JA in the direction required to close the fuel gas valve FA² results from the energization of an electro-magnetic or plunker switch mechanism KA, the winding of which is included in the conductor 6. The mechanism KA is thus energized and the winch JA is moved to close the valve FA², when the regenerator temperature conditions are such as to bring the galvanometer pointer G' into engagement with the contact g'. Similarly the closure of the fuel gas supply valve FB² is effected by the energization of an electro-magnetic or plunker switch mechanism KB, which occurs when the regenerative temperatures are such as to bring the galvanometer pointer G' into engagement with the contact g².

The energization circuits for the winches JA and JB and for the motor I are inter-connected so that following each movement of the winch JA required to close the valve FA², the motor I is operated to adjust the valves DA and DB as required to open the ports A⁴ and B³ and to close the ports B⁴ and A³. This actuation of the motor I effects, and is followed by, the energization of the motor winch JB required to open the valve FB². When thereafter a change in regenerator temperatures brings the galvanometer pointer G' into engagement with the contact g², the plunker KB is energized and the motor winch JB closes the valve FB², the motor I is next operated to adjust the valve DA and DB as required to open the ports A³ and B⁴, and to close the ports A⁴ and B³, and finally, the motor winch JA is operated to open the valve FA².

The energizing circuit through which the motor winch JA is operated to close the valve FA², comprises a conductor 41 connecting the supply conductor 4 to one motor terminal of the winch JA, a conductor 42 connecting a second winch motor terminal to a switch contact of the plunker mechanism KA, a conductor 43 connected to the conductor 42 by the plunker mechanism KA when the latter is energized, a limit switch LA which connects the conductor 43 to a conductor 44 when the valve FA² is out of its closed position, the conductor 44 running from the switch LA to the supply conductor 5. A limit switch actuator JA' carried by the cable connection between the winch JA and the valve FA² operates the switch LA to disconnect the conductors 43 and 44 and thus interrupt the valve closing energization of the winch JA when the valve FA² reaches its closed position, and to connect the conductor 44 to a conductor 45.

With the crank disc I² in the position shown in Fig. 3 the limit switch IA connects the conductor 45 to a conductor 46 running from the limit switch IA to one terminal of the motor I. A second terminal of the motor I is connected by a conductor 49 to the supply conductor 4. The closure of the energizing circuit for the motor I including the conductors 44, 45, 46 and 49 causes the motor I to rotate crank disc I² in the counterclockwise direction from the position shown in Fig. 3, into the position in which the valves DA and DB close the ports A³ and B⁴ and open the ports B³ and A⁴, and in which the valve FA' is open and the valve FB' is closed. On such movement of the disc I², a projection IA⁵ actuates the limit switch IA to disconnect the conductors 45 and 46, and thus interrupts the motion in the counterclockwise direction of the crank disc I².

The adjustment of the limit switch IA effected by the projection IA⁵, connects the conductor 45 to a conductor 47. The latter extends from the limit switch IA to a limit switch LB' controlled by the limit switch actuator JB', and closed at all times except when the valve FB² is in its wide open position. The limit switch LB' is connected to one motor terminal of the motor winch JB and the latter is operated to open the valve FB² by an energizing circuit which includes the supply conductor 5, conductors 44, 45, 47, 48 and 51. On the movement of the valve FB² into its wide open position, the limit switch actuator JB' opens the limit switch LB' and interrupts the motion of the winch JB.

The conductor 51 is a counter-part of the conductor 41, and the mechanism shown in Fig. 3 also includes conductors 52, 53, 54, 55, 56, 57 and 58 which are counter-parts of the conductors 41, 42, 43, 44, 45, 46, 47 and 48, respectively. The mechanism also includes a limit switch IB which is a counter-part of the limit switch IA and is actuated by a projection IB⁵ of the disc I², when the latter moves into and out of the position in which the valve FB' is closed, exactly as the limit switch IA is operated by the part IA⁵ when the disc I² moves into and out of the position in which the valve FB' is fully closed. Associated with the winch JA is a limit switch LA' which is a counter-part of the limit switch LB'.

It will be apparent, therefore, without further explanation that when the regenerator temperature conditions are such as to move the galvanometer pointer G' into engagement with the contact g', the apparatus shown in Fig. 3 operates first to close the fuel gas valve FA² and that the motor I is then operated to close the ports A³ and B⁴ and to open the ports B³ and A⁴, and that the motor winch JB is then operated to open the valve FB².

The use of the apparatus shown in Figs. 2 and 3 gives the regulation advantages obtainable with the simpler regulating arrangement of Fig. 1, and supplements those advantages by automatic control and actuation of reversing devices performing operations which in Fig. 1 are manually controlled and effected. For the purposes disclosed and claimed herein the form of apparatus herein illustrated and described may be widely varied. In particular, as those skilled in the art will readily understand, the apparatus shown diagrammatically and by way of example in the drawings may well be replaced in practice by commercial forms of apparatus now in general use for measuring and control purposes, or by other forms of apparatus suitable for use under particular conditions.

I am aware that various arrangements have been proposed heretofore for regulating the reversal times of regenerative furnaces in response to temperature conditions attained in the regenerator chambers, but such arrangements heretofore proposed have not gone into general use, and none of them, so far as I am aware, is similar to, or embodies the advantages of my present invention.

Having now described my invention, what I claim as new and desire to secure by Letters Patent is:—

1. The combination with a regenerative furnace, its regenerators and reversing mechanism, of means for regulating the operation of said mechanism, comprising thermo-couples, one associated with each regenerator in position to respond to the temperature at which gas heating, and gas to be heated in said regenerator, respectively, leaves and enters the latter, a galvanometer connected in series with said thermo-couples so as to be subjected to a voltage proportional to the difference between the temperatures of the thermo-couples, a contact energized by the galvanometer upon a predetermined deflection of the latter in one direction, a second contact energized by the galvanometer on a predetermined deflection of the latter in the opposite direction, a third contact energized by said galvanometer on intermediate deflections of the latter, and devices selectively actuated by the energization of said contacts.

2. The combination with a regenerative furnace, its two regenerators and reversing mechanism, of means for regulating the operation of said mechanism comprising thermo-couples, one associated with each regenerator in position to respond to the temperature at which gas heating, and gas to be heated in said regenerator, respectively, leaves and enters the latter, a galvanometer connected in series with said thermo-couples so as to be subjected to a voltage proportional to the difference between the temperatures of the thermo-couples, a contact energized by the galvanometer upon a predetermined deflection of the latter in one direction, a second contact energized by the galvanometer on a predetermined deflection of the latter in the opposite direction, and devices selectively actuated by the energization of said contacts, and means for adjusting said contacts to different positions along the path of galvanometer deflection.

3. The combination with a regenerative furnace and its two generators, each comprising air and fuel gas inlets, stack outlet connections and controlling valves for said inlets and connections, of means for automatically actuating said valves to reverse the flow through said regenerators comprising thermo-couples, one associated with each regenerator and responsive to the temperature thereof, a galvanometer controlled by said thermo-couples, and mechanism controlled by said galvanometer for periodically closing the previously open fuel gas inlet valve, and for then opening the previously closed, and closing the previously opened air inlet and stack connection valves, and for thereafter opening the previously closed fuel inlet valve.

4. The combination with a regenerative furnace, its regenerators and reversing mechanism, of means for regulating the operation of said mechanism comprising a thermo-couple associated with each regenerator in position to respond to the temperature at which gas to be heated, and heating gas passing through the regenerator, respectively, enters and leaves the latter, a galvanometer so connected in series with said thermo-couples as to be subjected to a voltage proportional to the difference between the temperatures of the thermo-couples, spaced apart contacts energized by the galvanometer deflection to opposite extreme positions, means for adjusting said contacts angularly about the axis of deflection, and devices actuated by the energization of said contacts.

5. The combination with a regenerative furnace, its regenerators and reversing mechanism, of means for regulating the operation of said mechanism comprising a thermo-couple associated with each regenerator and responsive to the temperature therein, a galvanometer connected to said thermo-couples and thereby subjected to a voltage proportional to the difference between the temperatures of the thermo-couples and deflecting in one direction or the other in accordance with the direction of change of said voltage, spaced apart contacts at opposite sides of an intermediate position of galvanometer deflection and energized by corresponding galvanometer deflections to opposite extreme positions, means for adjusting said contacts angularly about the axis of deflection, and devices actuated by the energization of said contacts.

JOHN R. GREEN.